United States Patent
Storm

(10) Patent No.: US 8,696,800 B2
(45) Date of Patent: Apr. 15, 2014

(54) SYSTEMS AND METHODS FOR CLEANING AIR

(75) Inventor: Timothy Wayne Storm, Tyler, TX (US)

(73) Assignee: Trane International Inc., Piscataway, NJ (US)

( * ) Notice: Subject to any disclaimer, the term of this patent is extended or adjusted under 35 U.S.C. 154(b) by 384 days.

(21) Appl. No.: 13/076,042

(22) Filed: Mar. 30, 2011

(65) Prior Publication Data

US 2012/0247326 A1    Oct. 4, 2012

(51) Int. Cl.
*B03C 3/00*    (2006.01)
*B03C 3/68*    (2006.01)

(52) U.S. Cl.
USPC .................................. 96/25; 95/26; 700/276

(58) Field of Classification Search
CPC ............ B03C 3/34; B03C 3/36; B01D 46/44; B01D 46/46; B01D 46/4263; F24F 11/08; F24F 11/0079; F24F 11/0086; F24F 2011/0057
USPC .................................. 96/25; 95/26; 700/276
See application file for complete search history.

(56) References Cited

U.S. PATENT DOCUMENTS

| | | | |
|---|---|---|---|
| 5,035,728 A | 7/1991 | Fang | |
| 6,318,639 B1 | 11/2001 | Toth | |
| 6,428,611 B1 | 8/2002 | Andolino et al. | |
| 6,616,736 B2 * | 9/2003 | Massey et al. | 96/25 |
| 7,025,281 B2 | 4/2006 | DeLuca | |
| 7,274,972 B2 * | 9/2007 | Amundson et al. | 700/276 |
| 7,475,828 B2 | 1/2009 | Bartlett et al. | |
| 7,488,375 B1 | 2/2009 | Chen | |
| 2001/0029728 A1 | 10/2001 | Massey et al. | |
| 2005/0011171 A1 * | 1/2005 | Lee et al. | 55/471 |
| 2005/0257540 A1 | 11/2005 | Choi et al. | |

FOREIGN PATENT DOCUMENTS

WO    2007097513 A2    8/2007

OTHER PUBLICATIONS

PCT International Search Report; PCT Application No. PCT/US2012/026118; Aug. 23, 2012; 4 pgs.
PCT Written Opinion of the International Searching Authority; PCT/US2012/026118; Aug. 23, 2012; 7 pgs.
PCT International Preliminary Report on Patentability; Application No. PCT/US2012/026188; Oct. 10, 2013; 8 pages.

* cited by examiner

*Primary Examiner* — Robert Clemente
(74) *Attorney, Agent, or Firm* — Conley Rose, P.C.; J. Robert Brown, Jr.; Michael J. Schofield

(57) ABSTRACT

An HVAC system has an electrically powered air cleaner, a fan configured to selectively move air through the air cleaner, and a controller having an interface for receiving a selection of a clean air cycle. The controller is configured to control a clean air delivery rate (CADR) of the HVAC system for a clean air cycle duration in response to a receipt of a selection of the clean air cycle. A method of controlling air cleaning includes displaying a first clean air cycle that is configured to control a clean air delivery rate for a first clean air cycle duration wherein the first clean air cycle is associated with a first air flow related setting and a first air cleaner power level setting, selecting the first clean air cycle, and overriding at least one of a previous air flow related setting and a previous air cleaner power level setting.

20 Claims, 7 Drawing Sheets

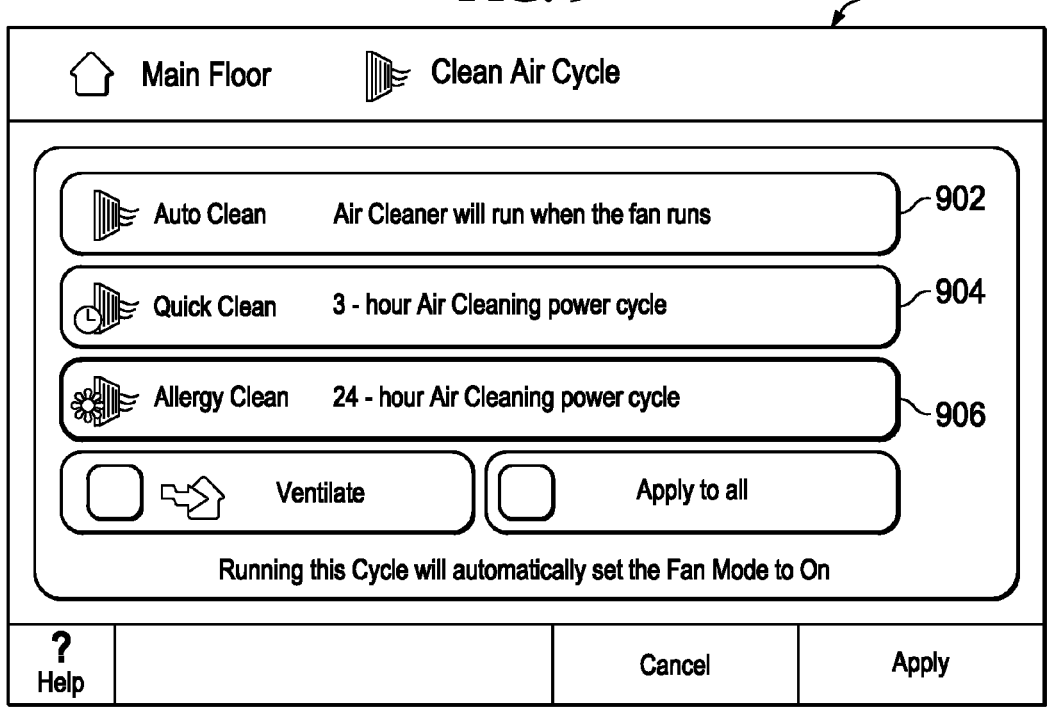
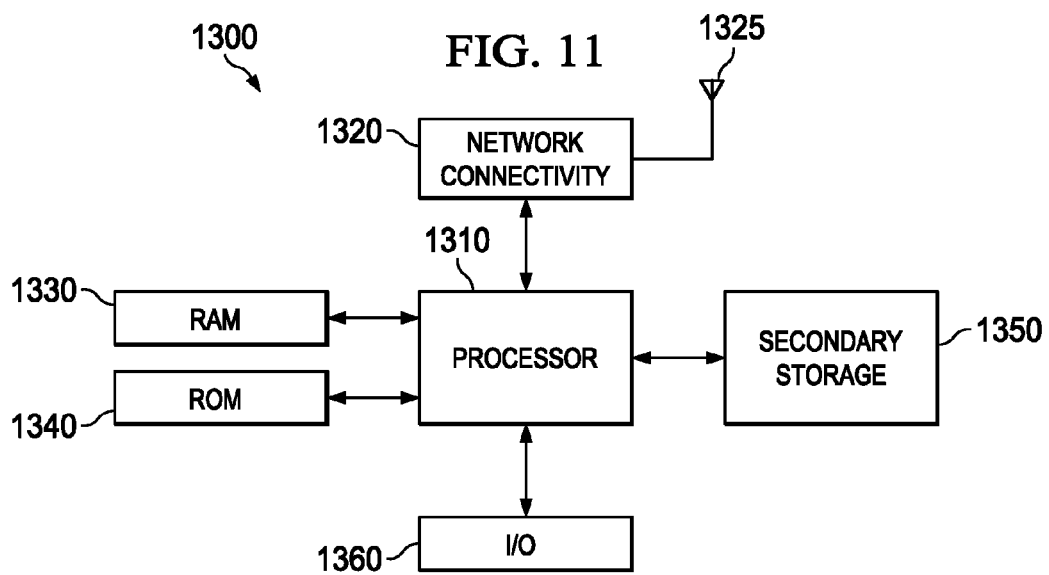

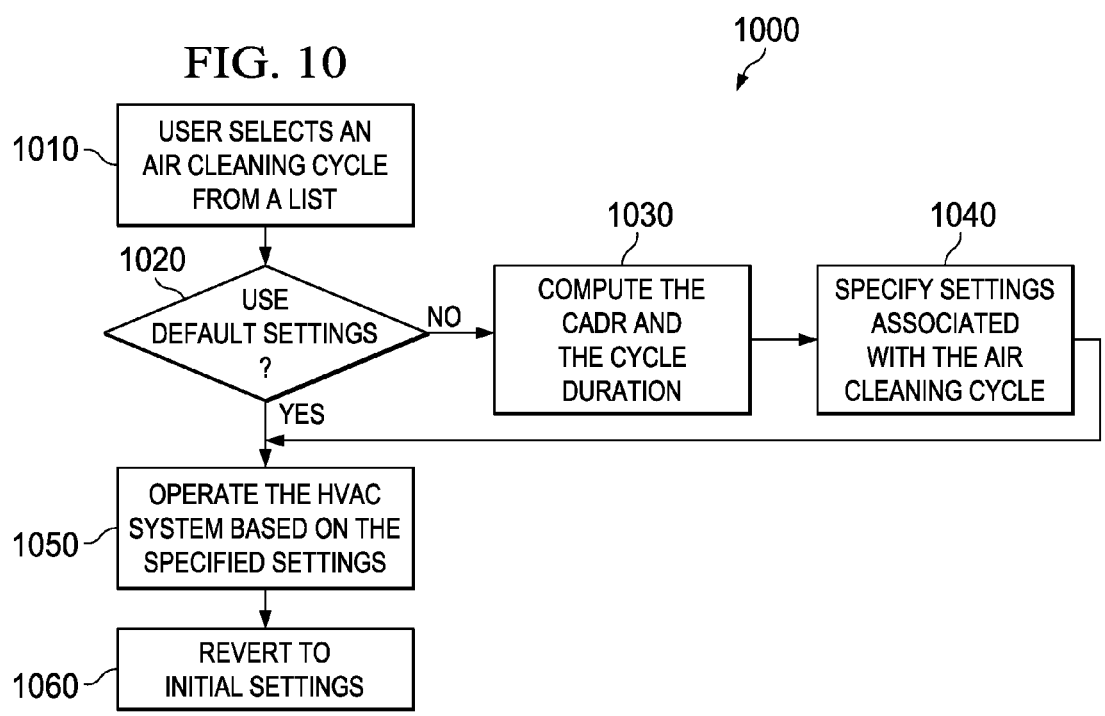

SYSTEMS AND METHODS FOR CLEANING AIR

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Indoor air pollution may lessen enjoyment of an indoor space as well as present a health hazard. Indoor air pollution may comprise airborne pollutants such as dust, smoke, pollen, animal dander, mold, and mildew may be present in indoor spaces in quantities sufficient to present a health hazard to occupants of the indoor space. Some heating, ventilation, and air conditioning (HVAC) systems comprise an air cleaner to filter pollutants from air circulated through the HVAC systems.

SUMMARY OF THE DISCLOSURE

In some embodiments of the disclosure, an HVAC system is provided that comprises an electrically powered air cleaner, a fan configured to selectively move air through the air cleaner, and a controller comprising an interface for receiving a selection of a clean air cycle. The controller may be configured to control a clean air delivery rate (CADR) of the HVAC system for a clean air cycle duration in response to a receipt of a selection of the clean air cycle.

In other embodiments of the disclosure, a method of controlling air cleaning is disclosed. The method comprises displaying a first clean air cycle that is configured to control a clean air delivery rate for a first clean air cycle duration, wherein the first clean air cycle is associated with a first air flow related setting and a first air cleaner power level setting, selecting the first clean air cycle, and overriding at least one of a previous air flow related setting and a previous air cleaner power level setting.

In yet other embodiments of the disclosure, a system controller for an HVAC system is disclosed. The system controller comprises an interface configured to present a first clean air cycle for optional selection wherein the first clean air cycle comprises a first air flow related setting, a first air cleaner power level setting, and a first clean air cycle duration setting and at least one of a previous air flow related setting and a previous air cleaner power level setting. In response to a selection of the first clean air cycle, the system controller is configured to operate the HVAC system so that at least one of (1) the HVAC system discontinues operation according to the previous air flow related setting and operates according to the first air flow related setting according to the first clean air cycle duration setting and (2) the HVAC system discontinues operation according to the previous air cleaner power level setting and operates according to the first air cleaner power level setting according to the first clean air cycle duration setting.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 9 is a clean air cycle menu of system controller of the HVAC system of FIG. 1;

FIG. 10 is a simplified flowchart of a method of controlling air cleaning according to an embodiment of the disclosure; and FIG. 11 is a simplified representation of a general-purpose processor (e.g., electronic controller or computer) system suitable for implementing the embodiments of the disclosure.

DETAILED DESCRIPTION

Some HVAC systems comprising air cleaners are generally passive insofar as the air cleaners simply filter air primarily when an indoor fan of the HVAC system is caused to operate according to a call for heating, a call for cooling, and/or due to other temperature regulation, air circulation, and/or ventilation purposes. As such, operation of an air cleaner and the resultant provision of air cleaned by an air cleaner of such an HVAC system may not be responsive to a user's demand for delivery of air cleaned by an air cleaner. Accordingly, this disclosure provides systems and methods for actively controlling an air cleaner of an HVAC system in accordance with a user's demand for air cleaned by an air cleaner. This disclosure further provides systems and methods for optionally controlling an indoor fan of an HVAC system and/or an air cleaner of the HVAC system to provide air cleaned by the air cleaner in response to a user's request for such via a system controller of the HVAC system.

Figure 1:
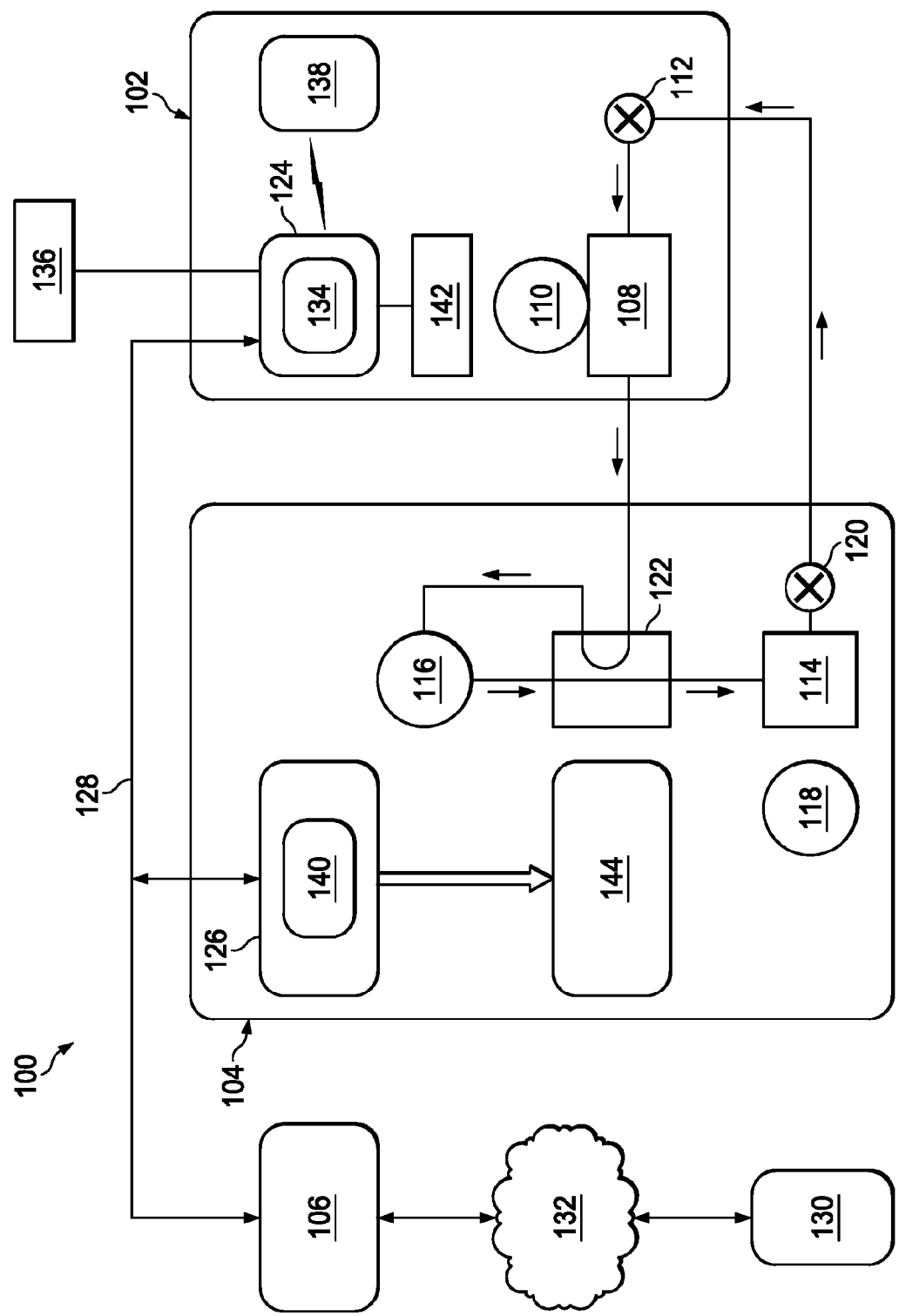
FIG. 1 is simplified schematic diagram of an HVAC system according to an embodiment of the disclosure.

Referring now to FIG. 1, a simplified schematic diagram of an HVAC system 100 according to an embodiment of this disclosure is shown. HVAC system 100 comprises an indoor unit 102, an outdoor unit 104, and a system controller 106. In some embodiments, the system controller 106 may operate to control operation of the indoor unit 102 and/or the outdoor unit 104. As shown, the HVAC system 100 is a so-called heat pump system that may be selectively operated to implement one or more substantially closed thermodynamic refrigeration cycles to provide a cooling functionality and/or a heating functionality.

Indoor unit 102 comprises an indoor heat exchanger 108, an indoor fan 110, and an indoor metering device 112. Indoor heat exchanger 108 is a plate fin heat exchanger configured to allow heat exchange between refrigerant carried within internal tubing of the indoor heat exchanger 108 and fluids that contact the indoor heat exchanger 108 but that are kept segregated from the refrigerant. In other embodiments, indoor heat exchanger 108 may comprise a spine fin heat exchanger, a microchannel heat exchanger, or any other suitable type of heat exchanger.

The indoor fan 110 is a centrifugal blower comprising a blower housing, a blower impeller at least partially disposed within the blower housing, and a blower motor configured to selectively rotate the blower impeller. In other embodiments, the indoor fan 110 may comprise a mixed-flow fan and/or any other suitable type of fan. The indoor fan 110 is configured as a modulating and/or variable speed fan capable of being operated at many speeds over one or more ranges of speeds. In other embodiments, the indoor fan 110 may be configured a multiple speed fan capable of being operated at a plurality of operating speeds by selectively electrically powering different ones of multiple electromagnetic windings of a motor of the indoor fan 110. In yet other embodiments, the indoor fan 110 may be a single speed fan.

The indoor metering device 112 is an electronically controlled motor driven electronic expansion valve (EEV). In alternative embodiments, the indoor metering device 112 may comprise a thermostatic expansion valve, a capillary tube assembly, and/or any other suitable metering device. The indoor metering device 112 may comprise and/or be associated with a refrigerant check valve and/or refrigerant bypass for use when a direction of refrigerant flow through the indoor metering device 112 is such that the indoor metering device 112 is not intended to meter or otherwise substantially restrict flow of the refrigerant through the indoor metering device 112.

Outdoor unit 104 comprises an outdoor heat exchanger 114, a compressor 116, an outdoor fan 118, an outdoor metering device 120, and a reversing valve 122. Outdoor heat exchanger 114 is a microchannel heat exchanger configured to allow heat exchange between refrigerant carried within internal passages of the outdoor heat exchanger 114 and fluids that contact the outdoor heat exchanger 114 but that are kept segregated from the refrigerant. In other embodiments, outdoor heat exchanger 114 may comprise a spine fin heat exchanger, a plate fin heat exchanger, or any other suitable type of heat exchanger.

The compressor 116 is a multiple speed scroll type compressor configured to selectively pump refrigerant at a plurality of mass flow rates. In alternative embodiments, the compressor 116 may comprise a modulating compressor capable of operation over one or more speed ranges, the compressor 116 may comprise a reciprocating type compressor, the compressor 116 may be a single speed compressor, and/or the compressor 116 may comprise any other suitable refrigerant compressor and/or refrigerant pump.

The outdoor fan 118 is an axial fan comprising a fan blade assembly and fan motor configured to selectively rotate the fan blade assembly. In other embodiments, the outdoor fan 118 may comprise a mixed-flow fan, a centrifugal blower, and/or any other suitable type of fan and/or blower. The outdoor fan 118 is configured as a modulating and/or variable speed fan capable of being operated at many speeds over one or more ranges of speeds. In other embodiments, the outdoor fan 118 may be configured as a multiple speed fan capable of being operated at a plurality of operating speeds by selectively electrically powering different ones of multiple electromagnetic windings of a motor of the outdoor fan 118. In yet other embodiments, the outdoor fan 118 may be a single speed fan.

The outdoor metering device 120 is a thermostatic expansion valve. In alternative embodiments, the outdoor metering device 120 may comprise an electronically controlled motor driven EEV, a capillary tube assembly, and/or any other suitable metering device. The outdoor metering device 120 may comprise and/or be associated with a refrigerant check valve and/or refrigerant bypass for use when a direction of refrigerant flow through the outdoor metering device 120 is such that the outdoor metering device 120 is not intended to meter or otherwise substantially restrict flow of the refrigerant through the outdoor metering device 120.

The reversing valve 122 is a so-called four-way reversing valve. The reversing valve 122 may be selectively controlled to alter a flow path of refrigerant in the HVAC system 100 as described in greater detail below. The reversing valve 122 may comprise an electrical solenoid or other device configured to selectively move a component of the reversing valve 122 between operational positions.

The system controller 106 may comprise a touchscreen interface for displaying information and for receiving user inputs. The system controller 106 may display information related to the operation of the HVAC system 100 and may receive user inputs related to operation of the HVAC system 100. However, the system controller 106 may further be operable to display information and receive user inputs tangentially and/or unrelated to operation of the HVAC system 100. In some embodiments, the system controller 106 may selectively communicate with an indoor controller 124 of the indoor unit 102, with an outdoor controller 126 of the outdoor unit 104, and/or with other components of the HVAC system 100. In some embodiments, the system controller 106 may be configured for selective bidirectional communication over a communication bus 128. In some embodiments, portions of the communication bus 128 may comprise a three-wire connection suitable for communicating messages between the system controller 106 and one or more of the HVAC system 100 components configured for interfacing with the communication bus 128. Still further, the system controller 106 may be configured to selectively communicate with HVAC system 100 components and/or other device 130 via a communication network 132. In some embodiments, the communication network 132 may comprise a telephone network and the other device 130 may comprise a telephone. In some embodiments, the communication network 132 may comprise the Internet and the other device 130 may comprise a so-called smartphone and/or other Internet enabled mobile telecommunication device.

The indoor controller 124 may be carried by the indoor unit 102 and may be configured to receive information inputs, transmit information outputs, and otherwise communicate with the system controller 106, the outdoor controller 126, and/or any other device via the communication bus 128 and/or any other suitable medium of communication. In some embodiments, the indoor controller 124 may be configured to communicate with an indoor personality module 134, receive information related to a speed of the indoor fan 110, transmit a control output to an electric heat relay, transmit information regarding an indoor fan 110 volumetric flow-rate, communicate with and/or otherwise affect control over an air cleaner 136, and communicate with an indoor EEV controller 138. In some embodiments, the indoor controller 124 may be configured to communicate with an indoor fan controller 142 and/or otherwise affect control over operation of the indoor fan 110. In some embodiments, the indoor personality module 134 may comprise information related to the identification and/or operation of the indoor unit 102.

In some embodiments, the indoor EEV controller 138 may be configured to receive information regarding temperatures and pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112.

The outdoor controller 126 may be carried by the outdoor unit 104 and may be configured to receive information inputs, transmit information outputs, and otherwise communicate with the system controller 106, the indoor controller 124, and/or any other device via the communication bus 128 and/or any other suitable medium of communication. In some embodiments, the outdoor controller 126 may be configured to communicate with an outdoor personality module 140 that may comprise information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the outdoor fan 118, a compressor sump heater, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with a compressor drive controller 144 that is configured to electrically power and/or control the compressor 116.

The HVAC system 100 is shown configured for operating in a so-called cooling mode in which heat is absorbed by refrigerant at the indoor heat exchanger 108 and heat is rejected from the refrigerant at the outdoor heat exchanger 114. In some embodiments, the compressor 116 may be operated to compress refrigerant and pump the relatively high temperature and high pressure compressed refrigerant from the compressor 116 to the outdoor heat exchanger 114 through the reversing valve 122 and to the outdoor heat exchanger 114. As the refrigerant is passed through the outdoor heat exchanger 114, the outdoor fan 118 may be operated to move air into contact with the outdoor heat exchanger 114, thereby transferring heat from the refrigerant to the air surrounding the outdoor heat exchanger 114. The refrigerant may primarily comprise liquid phase refrigerant and the refrigerant may be pumped from the outdoor heat exchanger 114 to the indoor metering device 112 through and/or around the outdoor metering device 120 which does not substantially impede flow of the refrigerant in the cooling mode. The indoor metering device 112 may meter passage of the refrigerant through the indoor metering device 112 so that the refrigerant downstream of the indoor metering device 112 is at a lower pressure than the refrigerant upstream of the indoor metering device 112. The pressure differential across the indoor metering device 112 allows the refrigerant downstream of the indoor metering device 112 to expand and/or at least partially convert to gaseous phase. The gaseous phase refrigerant may enter the indoor heat exchanger 108. As the refrigerant is passed through the indoor heat exchanger 108, the indoor fan 110 may be operated to move air into contact with the indoor heat exchanger 108, thereby transferring heat to the refrigerant from the air surrounding the indoor heat exchanger 108. The refrigerant may thereafter reenter the compressor 116 after passing through the reversing valve 122.

To operate the HVAC system 100 in the so-called heating mode, the reversing valve 122 may be controlled to alter the flow path of the refrigerant, the indoor metering device 112 may be disabled and/or bypassed, and the outdoor metering device 120 may be enabled. In the heating mode, refrigerant may flow from the compressor 116 to the indoor heat exchanger 108 through the reversing valve 122, the refrigerant may be substantially unaffected by the indoor metering device 112, the refrigerant may experience a pressure differential across the outdoor metering device 120, the refrigerant may pass through the outdoor heat exchanger 114, and the refrigerant may reenter the compressor 116 after passing through the reversing valve 122. Most generally, operation of the HVAC system 100 in the heating mode reverses the roles of the indoor heat exchanger 108 and the outdoor heat exchanger 114 as compared to their operation in the cooling mode.

Figure 2:
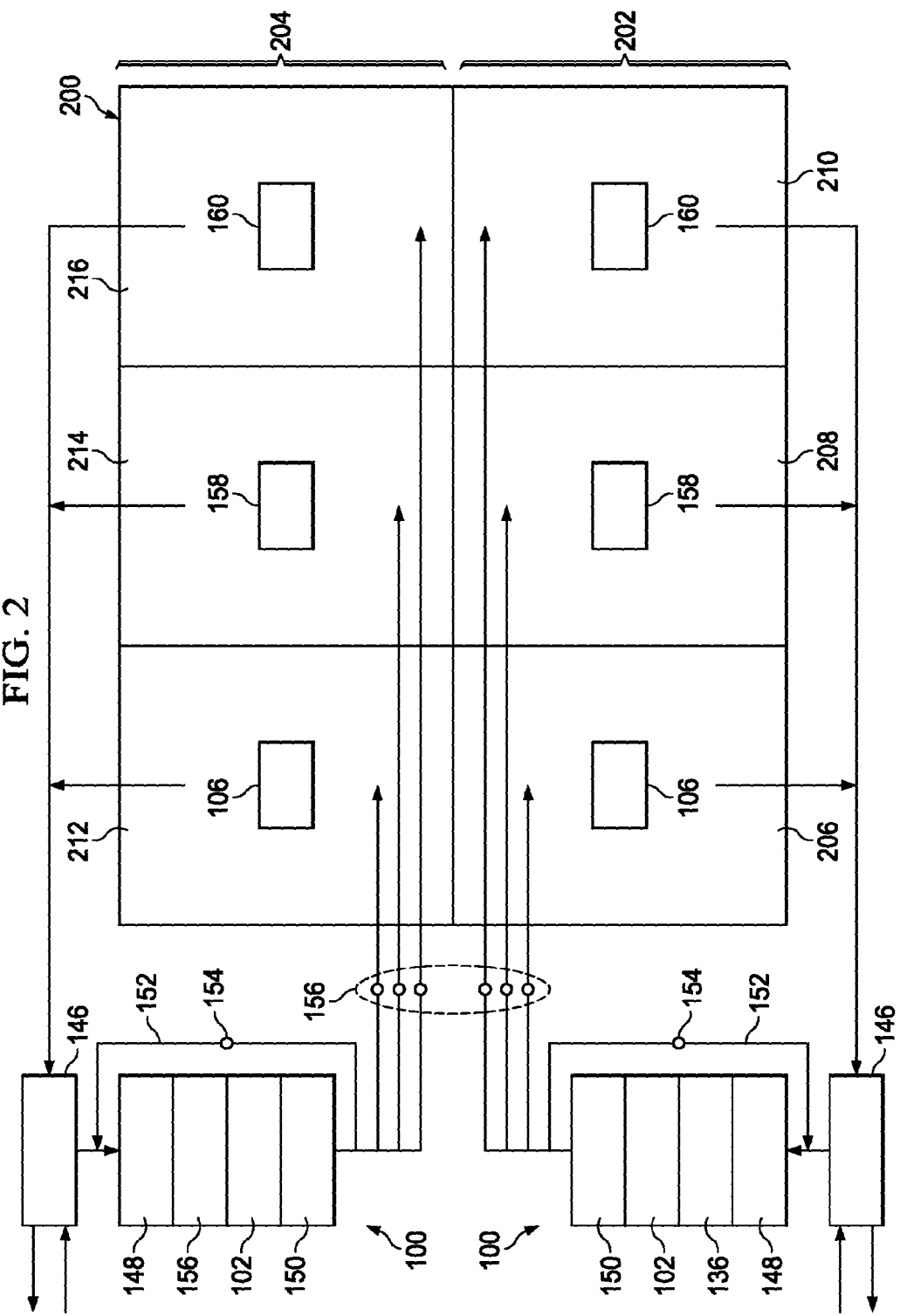
FIG. 2 is a simplified schematic diagram of the air circulation paths of the HVAC system of FIG. 1.

Referring now to FIG. 2, a simplified schematic diagram of the air circulation paths for a structure 200 conditioned by two HVAC systems 100 is shown. In this embodiment, the structure 200 is conceptualized as comprising a lower floor 202 and an upper floor 204. The lower floor 202 comprises zones 206, 208, and 210 while the upper floor 204 comprises zones 212, 214, and 216. The HVAC system 100 associated with the lower floor 202 is configured to circulate and/or condition air of lower zones 206, 208, and 210 while the HVAC system 100 associated with the upper floor 204 is configured to circulate and/or condition air of upper zones 212, 214, and 216.

In addition to the components of HVAC system 100 described above, in this embodiment, each HVAC system 100 further comprises a ventilator 146, a prefilter 148, a humidifier 150, and a bypass duct 152. The ventilator 146 may be operated to selectively exhaust circulating air to the environment and/or introduce environmental air into the circulating air. The prefilter 148 may generally comprise a filter media selected to catch and/or retain relatively large particulate matter prior to air exiting the prefilter 148 and entering the air cleaner 136. The humidifier 150 may be operated to adjust a relative humidity of the circulating air. The bypass duct 152 may be utilized to regulate air pressures within the ducts that form the circulating air flow paths. In some embodiments, air flow through the bypass duct 152 may be regulated by a bypass damper 154 while air flow delivered to the zones 206, 208, 210, 212, 214, and 216 may be regulated by zone dampers 156.

Still further, each HVAC system 100 may further comprise a zone thermostat 158 and a zone sensor 160. In some embodiments, a zone thermostat 158 may communicate with the system controller 106 and may allow a user to control a temperature, humidity, and/or other environmental setting for the zone in which the zone thermostat 158 is located. Further, the zone thermostat 158 may communicate with the system controller 106 to provide temperature, humidity, and/or other environmental feedback regarding the zone in which the zone thermostat 158 is located. In some embodiments, a zone sensor 160 may communicate with the system controller 106 to provide temperature, humidity, and/or other environmental feedback regarding the zone in which the zone sensor 160 is located.

While HVAC systems 100 are shown as a so-called split system comprising an indoor unit 102 located separately from the outdoor unit 104, alternative embodiments of an HVAC system 100 may comprise a so-called package system in which one or more of the components of the indoor unit 102 and one or more of the components of the outdoor unit 104 are carried together in a common housing or package. The HVAC system 100 is shown as a so-called ducted system where the indoor unit 102 is located remote from the conditioned zones, thereby requiring air ducts to route the circulating air. However, in alternative embodiments, an HVAC system 100 may be configured as a non-ducted system in which the indoor unit 102 and/or multiple indoor units 102 associated with an outdoor unit 104 is located substantially in the space and/or zone to be conditioned by the respective indoor units 102, thereby not requiring air ducts to route the air conditioned by the indoor units 102.

It will be appreciated that a so-called clean air delivery rate (CADR) of HVAC system 100 may be defined as the product of a volumetric flow-rate (sometimes expressed in units of cubic feet per minute or CFM) of air passing through air cleaner 136 multiplied by a so-called air cleaner efficiency of air cleaner 136. Accordingly, a relatively higher CADR may generally be accomplished by adjusting the volumetric flow-rate of air through the air cleaner 136 and/or by adjusting the air cleaner efficiency so that the product of the two is relatively increased. In this embodiment, air cleaner 136 may operate to clean air using a so-called electrostatic precipitation process. In some embodiments, the air cleaner 136 may comprise an electrically powered field charger configured to enable the electrostatic precipitation process. In some embodiments, varying an electrical supply to the field charger may vary a resultant performance and/or air cleaner efficiency of the air cleaner 136. For example, in some embodiments, providing a relatively higher voltage to the field charger may increase a performance and/or air cleaner efficiency of the air cleaner 136 as compared to a performance and/or air cleaner efficiency of the air cleaner 136 when a relatively lower voltage is provided to the field charger. In some embodiments, the air cleaner 136 may be configured to operate at one of three power level settings, high, medium, and low, each setting being indicative of relative voltage levels provided to the field charger.

In alternative embodiments, an air cleaner 136 may be configured to selectively modulate and/or vary a power level setting over one or more ranges of power levels. For example, the air cleaner 136 may even be capable of adjusting a voltage supplied to a field charger so that the air cleaner efficiency of the air cleaner 136 is adjustable over a relatively large range of values at which the air cleaner 136 may be effectively operated. Still further, in alternative embodiments of an air cleaner 136, the air cleaner 136 may comprise other components that affect air cleaner performance and/or an air cleaner efficiency of the air cleaner 136 in addition to or instead of a field charger. During subsequent discussion of a so-called air cleaner power setting and/or field charger power setting, it will be appreciated that it is intended that operating an air cleaner 136 at a relatively higher power setting is meant to control the air cleaner 136 and/or one or more of the components of the air cleaner 136 to have a first or higher rate of performance and/or air cleaner efficiency while operating the air cleaner 136 at a relatively lower power setting is meant to control the air cleaner 136 and/or one or more of the components of the air cleaner 136 to have a second or relatively lower rate of performance and/or air cleaner efficiency as compared to the first or higher rate of performance and/or air cleaner efficiency.

In some embodiments, the system controller 106 may be operated to allow a user to control the HVAC system 100 to meet a user's demand for air cleaned by the air cleaner 136. In some embodiments, the user's demand for the provision of cleaned air may comprise controlling one or more of or of (1) a volumetric flow-rate of air passing through the air cleaner 136, (2) a performance and/or air cleaner efficiency of the air cleaner 136, and (3) a duration of operation of the air cleaner 136 and/or indoor fan 110 that moves air through the air cleaner 136.

Figure 3:
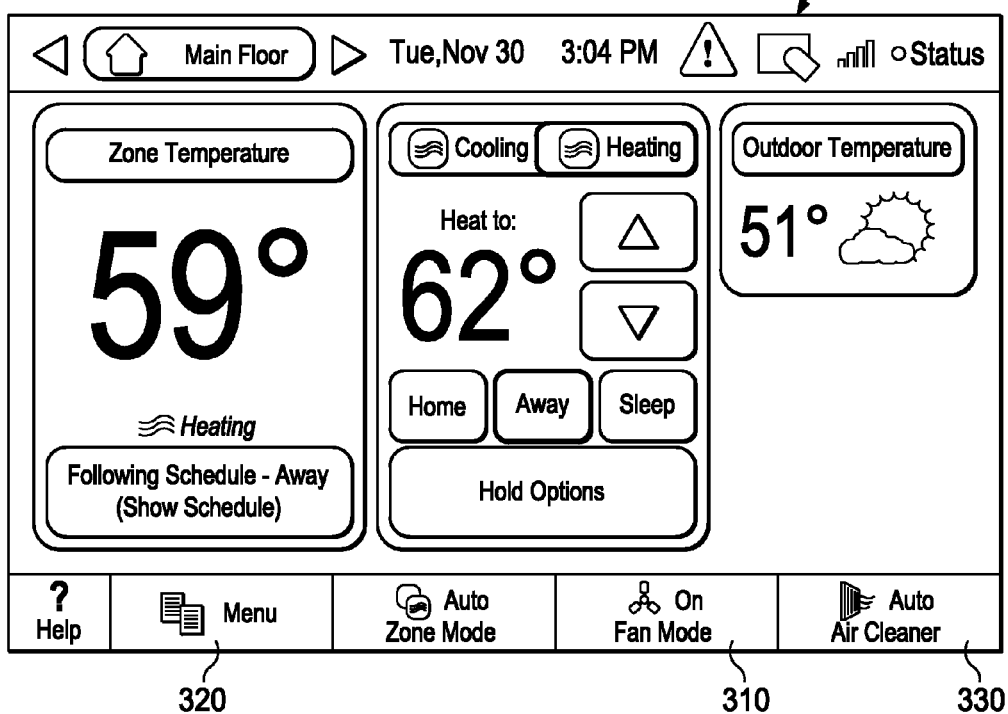
FIG. 3 is a home display of a system controller of the HVAC system of FIG. 1.
Figure 4:
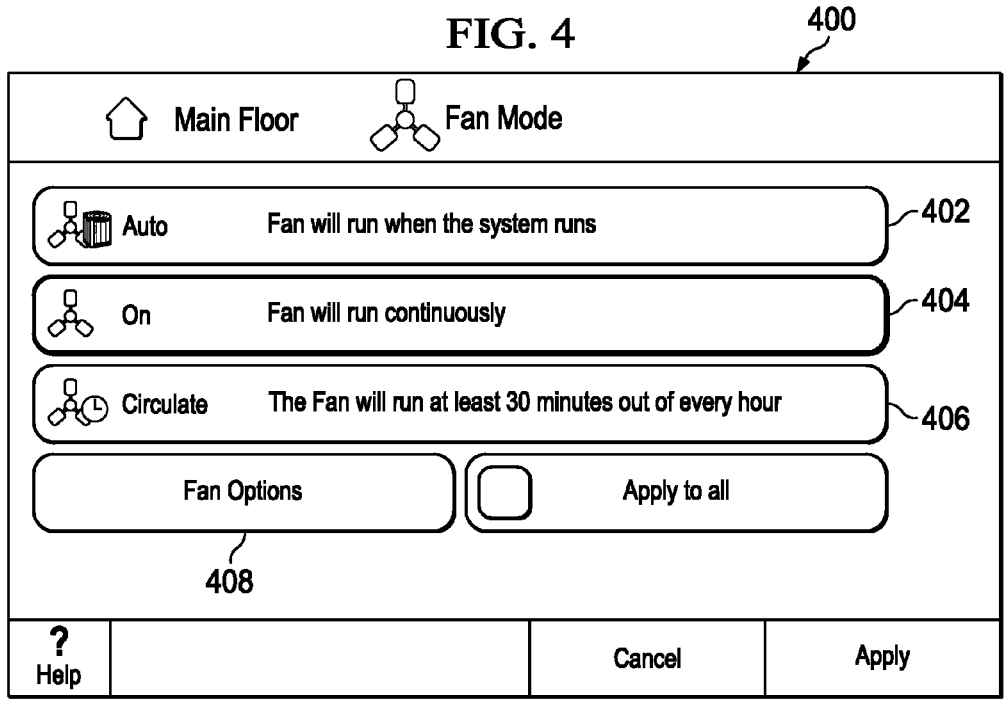
FIG. 4 is a fan mode menu of the system controller of the HVAC system of FIG. 1.
Figure 7:
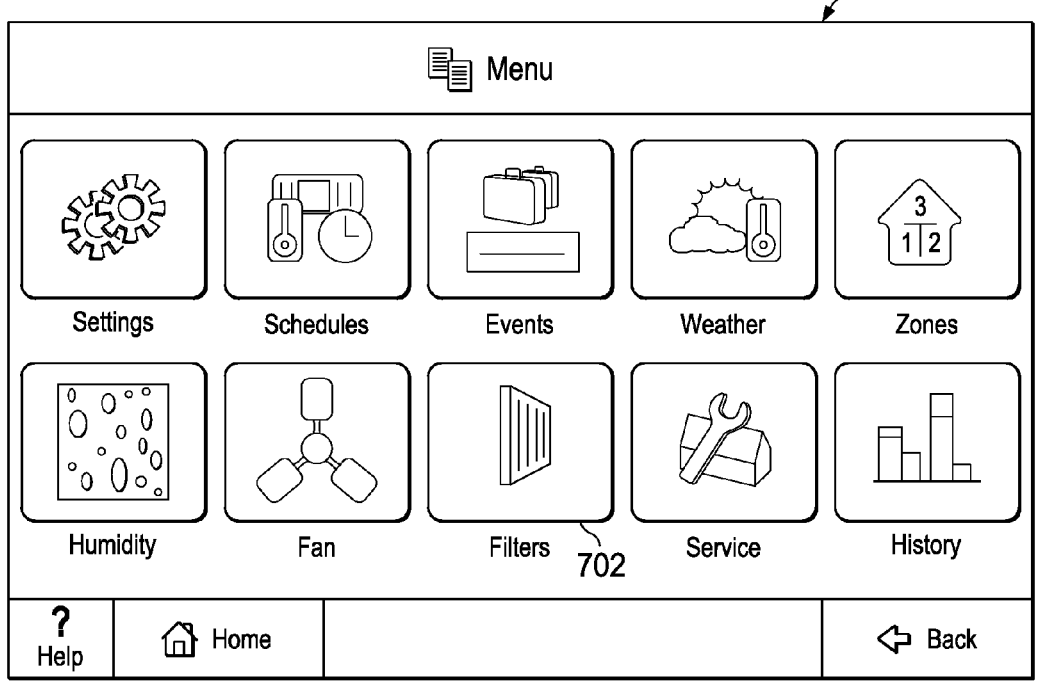
FIG. 7 is a main menu of the system controller of the HVAC system of FIG. 1.

Referring now to FIG. 3, a home display 300 of system controller 106 is shown. The home display 300 may display a measured temperature of a zone associated with air supplied by the HVAC system 100, indications of whether the HVAC system 100 is operating in a heating or cooling mode, a current heating and/or cooling temperature set point, a measured outdoor and/or ambient temperature, other HVAC system 100 operational settings, and/or other HVAC system 100 status information. The home display 300 comprises virtual buttons 310, 320, and 330. The virtual button 310 is selectively operable to cause the system controller 106 to present a fan mode menu 400 as shown in FIG. 4. Virtual button 320 is selectively operable to cause the system controller 106 to present a main menu 700 as shown in FIG. 7. Virtual button 330 is selectively operable to cause the system controller 106 to present a clean air cycle menu 900 of FIG. 9.

Referring now to FIG. 4, the fan mode menu 400 is shown. The fan mode menu 400 may allow a user to designate a preferred indoor fan 110 mode of operation. In some embodiments, the user may select between an "Auto" fan mode, an "On" fan mode, and a "Circulate" fan mode. A user may actuate a virtual button 402 to select the Auto fan mode, virtual button 404 to select the On fan mode, or virtual button 406 to select the Circulate fan mode. In some embodiments, when the Auto fan mode is selected and thereafter enabled, the indoor fan 110 may run when the HVAC system 100 is operating in either the cooling mode to meet a demand for cooling or the heating mode to meet a demand for heating. However, with the Auto fan mode enabled, once the demand for cooling or heating has been met and the HVAC system 100 is no longer operating to meet such a demand, operation of the indoor fan 110 may be discontinued.

When the fan On mode is selected, in some embodiments by operation of virtual button 404, and thereafter enabled, the indoor fan 110 may be operated during both the operation of the HVAC system 100 to meet a demand for heat or cool as well as when the HVAC system 100 is not operating to meet a demand for heat or cool. In other words, when the fan On mode is enabled, the indoor fan 110 may be operated substantially constantly unless some other HVAC system 100 feature is caused to override such operation. Further, selection of the virtual button 404 may cause presentation of a virtual button 408 configured to present a fan options menu 500.

Figure 5:
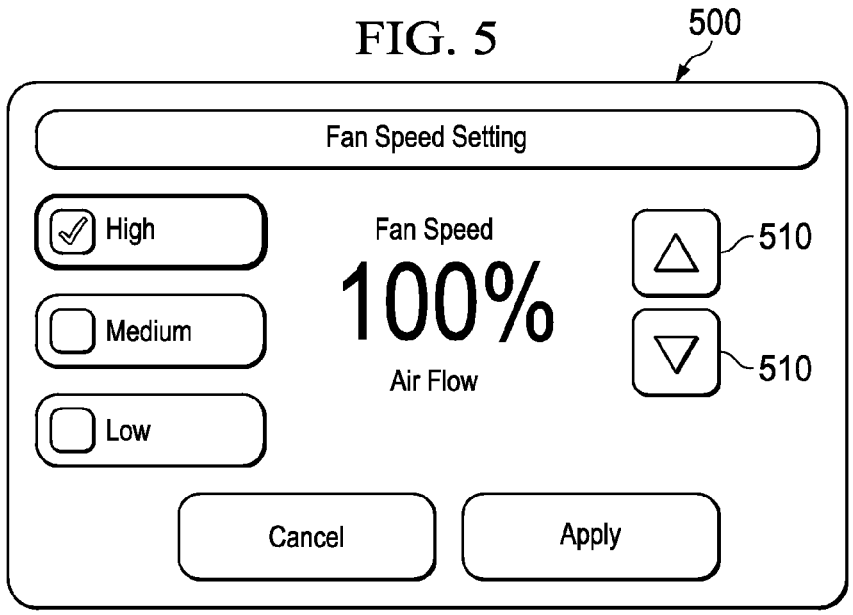
FIG. 5 is a fan options menu of the system controller of the HVAC system of FIG. 1.

Referring now to FIG. 5, the fan options menu 500 is shown. The fan options menu 500 may allow a user to designate a speed and/or percentage of operating capacity at which the indoor fan 110 should operate when the indoor fan 110 is operated according to the fan On mode but where the indoor fan 110 is not being operated because the HVAC system 100 is operating to meet a demand for cooling or heating. In some embodiments, a user may select between high, medium, and/or low fan speed settings. In some embodiments, the high speed setting may result in setting the indoor fan 110 to operate at about 100% fan speed and/or to provide 100% air flow. In some embodiments, the medium speed setting may result in setting the indoor fan 110 to operate at about 75% fan speed and/or to provide about 75% air flow. In some embodiments, the low speed setting may result in setting the indoor fan 110 to operate at about 50% fan speed and/or to provide about 50% air flow. However, in some embodiments, a user may be allowed to designate a particular percentage of fan speed and/or to designate a particular percentage of air flow by one of directly entering a desired value or selecting a desired value from a range of allowed values. For example, a user may be allowed to select any value from 25% to 100% in 5% increments by selectively actuating virtual buttons 510. Of course, in alternative embodiments, the ranges of available values may vary by having an available value of lower than 25%, above 100%, and/or in increments other than 5% increments.

Referring back to FIG. 4, when the fan Circulate mode is selected and thereafter enabled, the indoor fan 110 may be operated during both the operation of the HVAC system 100 to meet a demand for heat or cool as well as for a user selected duration per period of time. For example, in some embodiments, the period of time may be one hour and the user selected duration may be some time duration equal to or less than one hour. Further, selection of the virtual button 406 may cause presentation of a virtual button substantially similar to virtual button 408 configured to present another fan options menu 600.

Figure 6:
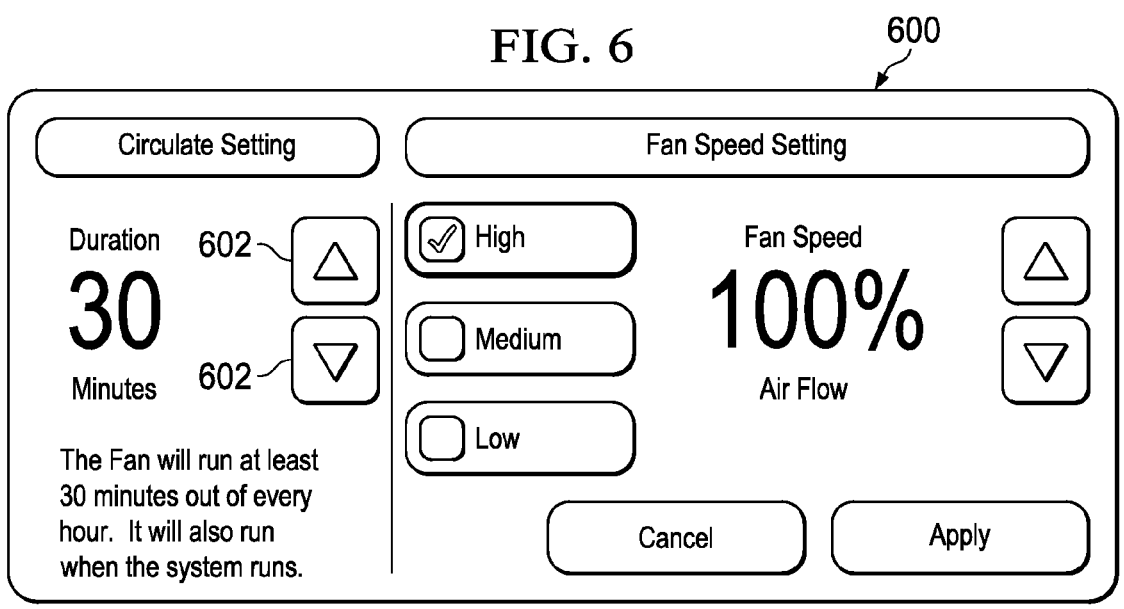
FIG. 6 is another fan options menu of the system controller of the HVAC system of FIG. 1.

Referring now to FIG. 6, a fan options menu 600 associated with the fan Circulate mode is shown. The fan options menu 600 may allow a user to designate a speed and/or percentage of operating capacity at which the indoor fan 110 should operate when the indoor fan 110 is operated according to the fan Circulate mode but where the indoor fan 110 is not being operated because the HVAC system 100 is operating to meet a demand for cooling or heating. In some embodiments, a user may select between high, medium, and/or low fan speed settings. In some embodiments, the fan speed may be selected by a user in a manner substantially similar to that described above with respect to the fan options menu 500. Fan options menu 600 may further allow a user to designate a circulation duration by one of directly entering a desired value or selecting a desired value from a range of allowed values. For example, a user may be allowed to select any value from 10 minutes per hour to 60 minutes per hour in 5 minute increments by selectively actuating virtual buttons 602. Of course, in alternative embodiments, the ranges of available values may vary by having an available value of lower than 10 minutes and/or in increments other than 5 minute increments. In yet other alternative embodiments, the duration may be a portion of a period of time different than one hour. For example, in some embodiments, a user may be allowed to designate a circulation duration per day. As such, a user may effectively control the indoor fan 110 to operate for at least a selected duration of time per each period. In some embodiments, the amount of time the indoor fan 110 is operated while the HVAC system 100 is operated to meet a demand for cooling or heating may count toward to the circulation duration of indoor fan 110 operation specified by the user.

Referring now to FIG. 7, the main menu 700 may is shown. In some embodiments, the main menu 700 may be presented as a result of operating the virtual button 320 of the home display 300 of FIG. 3. The main menu 700 comprises a plurality of virtual buttons configured to allow a user to navigate to a plurality of additional menus and displays. The main menu 700 comprises a virtual button 702 that is selectively operable to cause the system controller 106 to present a filters menu 800 of FIG. 8.

Figure 8:
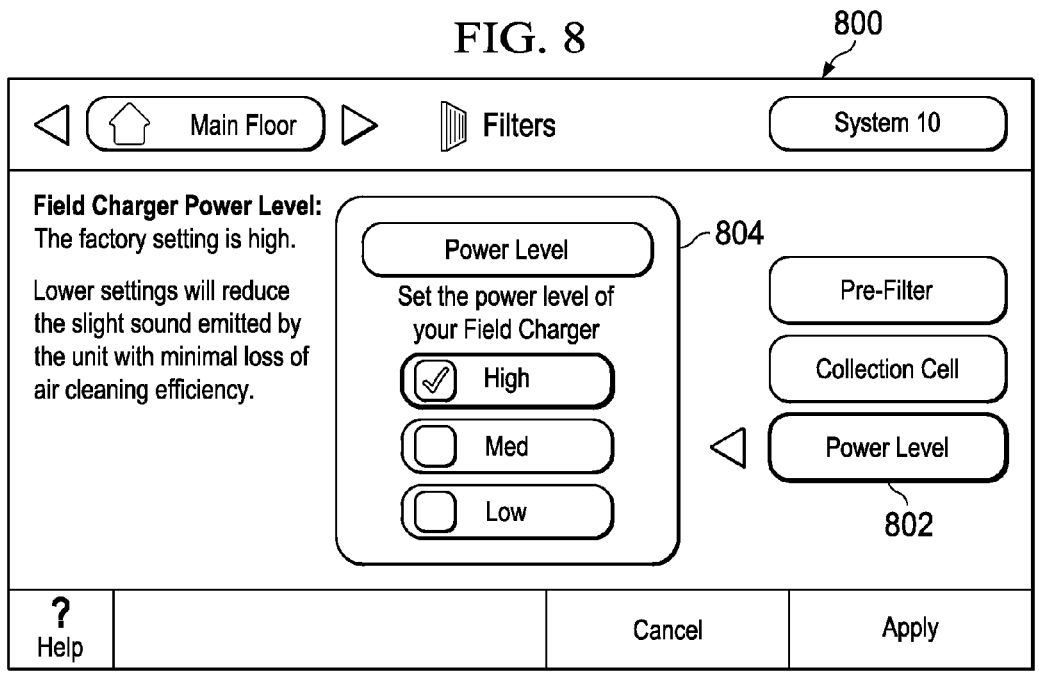
FIG. 8 is a filters menu of the system controller of the HVAC system of FIG. 1.

Referring now to FIG. 8, the filters menu 800 is shown. The filters menu 800 comprises a virtual button 802 that is selectively operable to cause the system controller 106 to present a power level menu 804. The power level menu 804 is configured to allow a user to select a power level setting for the air cleaner 136 and/or the field charger of the air cleaner 136. In some embodiments, setting the power level may be associated with adjusting a voltage supplied to the air cleaner 136 and/or the field charger of the air cleaner 136. The power level menu 804 comprises high, medium, and low settings for selection by a user.

Referring now to FIG. 9, the clean air cycle menu 900 is shown. In some embodiments, the clean air cycle menu 900 may be presented as a result of operating the virtual button of the home display 300 of FIG. 3. The clean air cycle menu 900 may allow a user to select between a plurality of so-called clean air cycles. The clean air cycle menu 900 comprises virtual buttons 902, 904, and 906. The virtual button 902 is selectively operable to cause the HVAC system 100 to operate according to a so-called auto clean cycle. In some embodiments, operation according to the auto clean cycle may allow operation of the indoor fan 110 and the air cleaner 136 according to settings that may have been set by a user via the displays and/or menus of FIGS. 3-8. As such, in some embodiments, selection of the auto clean cycle and/or operation according to the auto clean cycle may not alter any controls and/or settings that significantly contribute to setting and/or delivering a CADR of the HVAC system 100.

The virtual button 904 is selectively operable to cause the HVAC system 100 to operate according to a so-called quick clean cycle. In contrast to the auto clean cycle, selection of the quick clean cycle may alter both a CADR of the HVAC system 100 as well as a duration of operation of the indoor fan 110 and the air cleaner 136. For example, in some embodiments such as the embodiment shown in FIG. 9, selection of the quick clean cycle may result in altering control settings for both the indoor fan 110 and the air cleaner 136 for a duration of time. More specifically, the quick clean cycle comprises altering indoor fan 110 and air cleaner 136 settings to operate the HVAC system 100 at a maximum CADR for a duration of three hours. As such, operation according to the quick clean cycle may generally override and/or otherwise take precedence over other default and/or previously entered indoor fan 110 settings and/or air cleaner 136 settings. In some embodiments, the HVAC system 100 may be caused to operate according to the quick clean cycle until expiration of the above-described quick clean cycle duration of three hours. In some embodiments, upon expiration of the above-described quick clean cycle duration, the HVAC system 100 may revert to operation according to the above-describe auto clean cycle.

The virtual button 906 is selectively operable to cause the HVAC system 100 to operate according to a so-called allergy clean cycle. In contrast to the auto clean cycle, selection of the allergy clean cycle may alter both a CADR of the HVAC system 100 as well as a duration of operation of the indoor fan 110 and the air cleaner 136. For example, in some embodiments such as the embodiment shown in FIG. 9, selection of the quick clean cycle may result in altering control settings for both the indoor fan 110 and the air cleaner 136 for a duration of time. More specifically, the allergy clean cycle comprises altering indoor fan 110 and air cleaner 136 settings to operate the HVAC system at a maximum CADR for a duration of twenty-four hours. As such, operation according to the allergy clean cycle may generally override and/or otherwise take precedence over other default and/or previously entered indoor fan 110 settings and/or air cleaner 136 settings. In some embodiments, the HVAC system 100 may be caused to operate according to the allergy clean cycle until expiration of the above-described allergy clean cycle duration of twenty-four hours. In some embodiments, upon expiration of the above-described allergy clean cycle duration, the HVAC system 100 may revert to operation according to the above-describe auto clean cycle.

In alternative embodiments, a clean air cycle menu may provide any other number of virtual buttons that allow selection of any other number of clean air cycles. Further, in alternative embodiments, clean air cycles may be configured to allow operation of the HVAC system 100 at less than maximum CADRs. Still further, in alternative embodiments, clean air cycles may be configured to allow operation of the HVAC system 100 according to a selected clean air cycle for a cycle duration that is user-adjustable, randomly and/or pseudo-randomly generated, and/or may be dependent upon feedback from an environmental sensor (i.e., a sensor for providing feedback related to a level and/or type of pollution). In some embodiments, a user may create custom clean air cycles in which the user may define one or more of an indoor fan 110 speed and/or operational profile, an air cleaner 136 power setting and/or operational profile, and/or one or more conditions for determining a duration of operation according to the custom clean air cycle.

In some embodiments, a clean air cycle may be associated with a graphical icon that allows easy identification of the clean air cycle in one or more of the clean air cycle menu 900, the home display 300, and/or any other suitable menu and/or display. For example, as shown in FIG. 9, the quick clean cycle is associated with a graphical icon depicting a clock next to a filter while the allergy clean cycle is associated with a graphical icon depicting a flower next to a filter. Also shown in FIG. 9, the auto clean cycle is associated with a graphical icon depicting a filter. Referring now to FIG. 3, the virtual button 330 also comprises the icon associated with the auto clean cycle. Accordingly, the use of such graphical icons may be useful in both allowing the selection of clean air cycles by non-textual means as well as indicating a currently selected and/or operating clean air cycle by non-textual means.

Referring now to FIG. 10, a simplified flow chart of a method 1000 of controlling air cleaning is shown. The method 1000 may be implemented at a processing component of the system controller 106. The method 1000 starts at block 1010, where the user selects a desired clean air cycle. At block 1020, a determination is made in response to the selection made by the user, determines whether to use a plurality of pre-determined specified settings associated with the selected clean air cycle. In an embodiment, the specified settings comprise a plurality of specified operating parameters including a plurality of air flow related settings, a power level setting for the air cleaner 136, and a clean air cycle duration. In an embodiment, the air flow related settings comprises an indoor fan 110 speed setting. In an embodiment, the power level setting specifies the adjustment of a voltage of the air cleaner 136. In some embodiments, the operation of block 1020 may comprise a determination of whether a user has selected a predefined clean air cycle or a custom clean air cycle.

If the condition in block 1020 is met (i.e. a user has selected a predefined clean air cycle), the method 1000 may continue to block 1050. At block 1050, the HVAC system 100 may start operation of the selected clean air cycle and may override each of the plurality of current settings by their corresponding pre-determined specified settings for the duration of the selected clean air cycle. The method 1000 may progress to block 1060 after the expiration of the clean air cycle duration and the HVAC system 100 may revert to operation according to air flow related and air cleaner 136 power level settings present prior to the commencement of the clean air cycle.

If the condition in block 1020 is not met (i.e. a custom and/or feedback based cycle is selected by a user), the method 1000 may continue to block 1030 at which a CADR and a clean air cycle duration may be calculated and/or specified based on user inputs and/or environmental feedback. In an embodiment, the system controller 106 may compute an indoor fan 110 speed setting, air cleaner 136 power level setting, and/or a clean air cycle duration based on environmental feedback. In some embodiments, the environmental feedback may be provided by one or more sensors associated with the system controller 106, a zone thermostat 158, and/or a zone sensor 160. The environmental feedback may comprise information related to the type and/or quantity of pollution. In some embodiments, the system controller 106 may calculate an indoor fan 110 speed setting, air cleaner 136 power level setting, and/or a clean air cycle duration so that any ozone generated as a result of operation of the HVAC system 100 according to the calculated and applied settings is generated at safe rates and/or quantities.

At block 1040, the method 1000 may apply the settings calculated for the custom and/or feedback based clean air cycle selected by the user. In particular, the method 1000 may override previously applied and/or followed settings for the indoor fan 110 and/or the air cleaner 136. The method 1000 may then progress to block 1050. At block 1050, the HVAC system 100 may start operation of the selected clean air cycle and may override each of the plurality of current settings by their corresponding settings calculated at block 1030 and applied at block 1040 for the calculated and/or inputted clean air cycle duration of the selected clean air cycle. The method 1000 may progress to block 1060 after the expiration of the clean air cycle duration and the HVAC system 100 may revert to operation according to air flow related and air cleaner 136 power level settings present prior to the commencement of the clean air cycle.

Referring now to FIG. 11, the HVAC system 100 and/or other disclosed components may comprise one or more processing components capable of executing instructions related to the methods and/or operations described previously. The processing component may be a component of a computer system. FIG. 11 illustrates a typical, general-purpose processor (e.g., electronic controller or computer) system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, optical disk, or other drive). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA)

devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs or instructions that are loaded into RAM 1330 when such programs are selected for execution or information is needed.

The I/O devices 1360 may include liquid crystal displays (LCDs), touch screen displays, keyboards, keypads, switches, dials, mice, track balls, voice recognizers, card readers, paper tape readers, printers, video monitors, transducers, sensors, or other well-known input or output devices. Also, the transceiver 1325 might be considered to be a component of the I/O devices 1360 instead of or in addition to being a component of the network connectivity devices 1320. Some or all of the I/O devices 1360 may be substantially similar to various components disclosed herein.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, RI, and an upper limit, Ru, is disclosed, any number falling within the range is specifically disclosed. In particular, the following numbers within the range are specifically disclosed: $R=RI+k*(Ru-RI)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. An HVAC system, comprising:
    an electrically powered air cleaner;
    a fan configured to selectively move air through the air cleaner and a heat exchanger; and
    a controller comprising an interface for selectively receiving (1) an optional selection of at least one of a heating mode and a cooling mode and (2) an optional selection of a clean air cycle;
    wherein the controller is configured to control a clean air delivery rate (CADR) of the HVAC system for a clean air cycle duration in response to a receipt of a selection of the clean air cycle.

2. The HVAC system of claim 1, wherein the controller is configured to control the CADR by controlling at least one of a speed of the fan and a power level of the air cleaner.

3. The HVAC system of claim 1, wherein the controller is configured to temporarily override at least one of a speed of the fan and a power level of the air cleaner for the clean air cycle duration.

4. The HVAC system of claim 1, wherein the controller is configured to present a plurality of clean air cycles for selection by a user and wherein the plurality of clean air cycles control the CADR to achieve different CADR values.

5. The HVAC system of claim 1, wherein the controller is configured to present a plurality of clean air cycles for selection by a user and wherein the plurality of clean air cycles control the CADR for different clean air cycle durations.

6. The HVAC system of claim 1, wherein the air cleaner is an electrostatic precipitation air cleaner, wherein the interface is a touchscreen interface configured to display a virtual button associated with the clean air cycle, and wherein the controller is configured to control each of a speed of the fan and a power level of the air cleaner for the clean air cycle duration.

7. A method of controlling air cleaning, comprising:
    providing a controller comprising an interface configured to selectively present (1) at least one of a heating mode and a cooling mode for optional selection and (2) a first clean air cycle for optional selection, wherein the first clean air cycle is configured to control a clean air delivery rate for a first clean air cycle duration, and wherein the first clean air cycle is associated with a first air flow related setting and a first air cleaner power level setting;

selecting the first clean air cycle; and overriding at least one of a previous air flow related setting and a previous air cleaner power level setting;

wherein the first air flow related setting and the previous air flow related setting are associated with a volumetric air flow rate through a heat exchanger.

8. The method of claim 7, further comprising:

operating an air cleaning system according to the first air flow related setting and the first air cleaner power level setting for the first clean air cycle duration.

9. The method of claim 7, further comprising:

operating an air cleaning system according to at least one of the previous air flow related setting and the previous air cleaner power level setting in response to expiration of the first clean air cycle duration.

10. The method of claim 7, further comprising:

displaying a second clean air cycle that is configured to control the clean air delivery rate for a second clean air cycle duration, wherein the second clean air cycle is associated with a second air flow related setting and a second air cleaner power level setting.

11. The method of claim 10, wherein the first clean air cycle and the second clean air cycle are simultaneously displayed.

12. The method of claim 10, wherein the at least one of the first clean air cycle and the second clean air cycle are displayed as a virtual button.

13. The method of claim 10, wherein the first air flow related setting is different from the second air flow related setting.

14. The method of claim 10, wherein the first air cleaner power level setting is different from the second air cleaner power level setting.

15. The method of claim 10, wherein the first clean air cycle duration is different from the second clean air cycle duration.

16. A system controller for an HVAC system, comprising:

an interface configured to selectively present (1) at least one of a heating mode and a cooling mode for optional selection and (2) a first clean air cycle for optional selection wherein the first clean air cycle comprises a first air flow related setting, a first air cleaner power level setting, and a first clean air cycle duration setting; and at least one of a previous air flow related setting and a previous air cleaner power level setting;

wherein in response to a selection of the first clean air cycle, the system controller is configured to operate the HVAC system so that at least one of (1) the HVAC system discontinues operation according to the previous air flow related setting and operates according to the first air flow related setting according to the first clean air cycle duration setting and (2) the HVAC system discontinues operation according to the previous air cleaner power level setting and operates according to the first air cleaner power level setting according to the first clean air cycle duration setting; and wherein the first air flow related setting and the previous air flow related setting are associated with a volumetric air flow rate through a heat exchanger.

17. The system controller of claim 16, wherein the system controller is configured to revert back to operation of the HVAC system according to at least one of the previous air flow related setting and the previous air cleaner power level setting in response to expiration of a first time period of the first clean air cycle duration setting.

18. The system controller of claim 16, wherein the system controller is configured to present a second clean air cycle simultaneously with the first clean air cycle.

19. The system controller of claim 18, wherein the first clean air cycle is associated with a first clean air delivery rate (CADR) and wherein the second clean air cycle is associated with a second CADR different from the first CADR.

20. The system controller of claim 18, wherein the second clean air cycle is associated with a second clean air cycle duration setting different from the first clean air cycle duration.

* * * * *